Sept. 7, 1948.  L. M. DOLAN  2,448,785

LAMINATED CORE CONSTRUCTION

Filed May 3, 1945

Inventor:
Loyd M. Dolan,
by Harry E. Dunham
His Attorney.

Patented Sept. 7, 1948

2,448,785

UNITED STATES PATENT OFFICE 2,448,785

LAMINATED CORE CONSTRUCTION

Loyd M. Dolan, Fort Wayne, Ind., assignor to General Electric Company, a corporation of New York Application May 3, 1945, Serial No. 591,692

8 Claims. (Cl. 171—252)

My invention relates to improvements in laminated core constructions for electrical devices and in particular to an improved dynamoelectric machine core member.

An object of my invention is to provide an improved and simplified laminated core construction for electrical devices.

Another object of my invention is to provide an improved dynamoelectric machine core member.

Further objects and advantages of my invention will become apparent and my invention will be better understood from the following description referring to the accompanying drawing, and the features of novelty which characterize my invention will be pointed out with particularity in the claims annexed to and forming a part of this specification.

Figure 1:
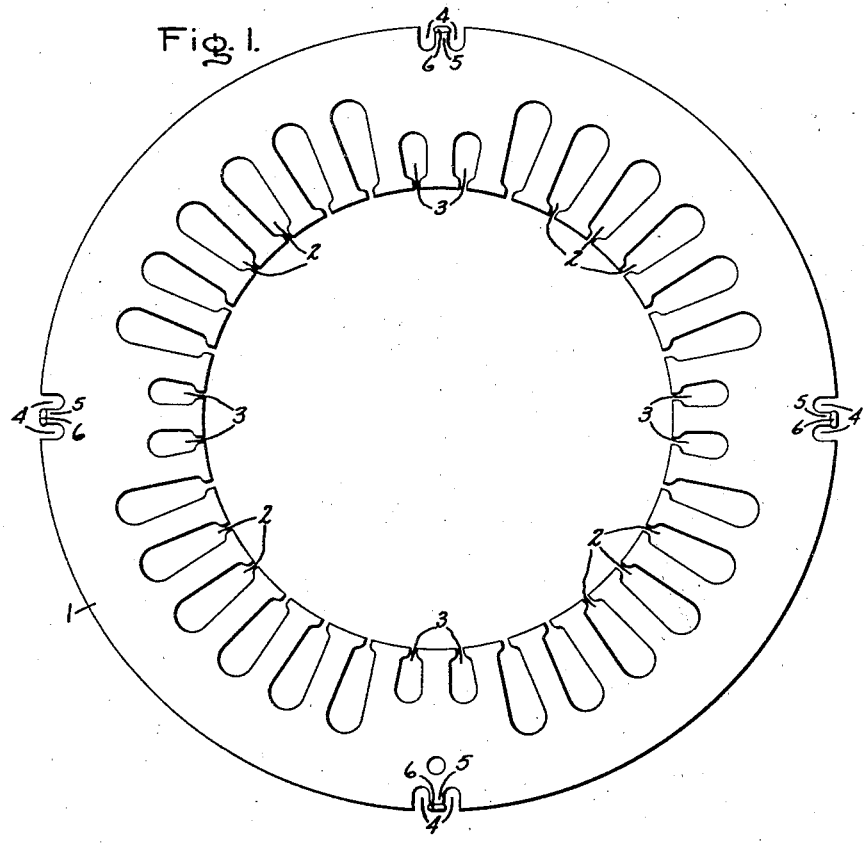
Figure 2:
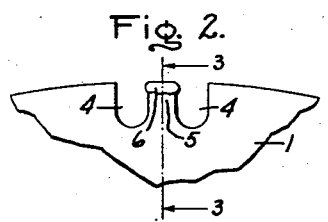
Figure 3:
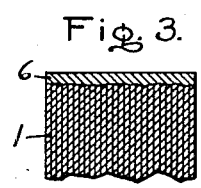

In the drawing, Fig. 1 is a side elevational view of a laminated core adapted to be used as a stationary member of a dynamoelectric machine; Fig. 2 is an enlarged view of a fragment of the core shown in Fig. 1 to illustrate more clearly a feature of my improved construction for retaining the laminations of the core in assembled relationship; and Fig. 3 is a sectional view along line 3—3 of Fig. 2.

Referring to the drawing, I have shown my invention in connection with a laminated core for the stationary member of a dynamoelectric machine which includes an assembly of a plurality of laminations 1 formed of magnetic material and having a plurality of sets of relatively deep winding slots 2 formed in one edge thereof and a plurality of sets of relatively shallow winding slots 3 arranged intermediate adjacent sets of the relatively deep winding slots, thereby providing a deeper section of magnetic material between the base of the shallow winding slots 3 and the outer peripheral surface of the core than between the bottom of the relatively deep winding slots 2 and the outer periphery of the laminated core. In order to secure together the laminations in assembled relationship, I provide a pair of closely spaced apart shallow notches 4 in the outer edge of the laminations which form a pair of shallow longitudinally extending slots in the edge of the core opposite each of the sets of shallow winding slots 3 on the inner edge of the core, thereby forming a relatively narrow tooth 5 extending longitudinally over a peripheral surface of the laminations. The outer edge of the tooth 5 is welded to a relatively shallow depth by any suitable means, such as by an electric arc, oxy-acetylene or atomic hydrogen flame with or without flux and filler rod. It has been found that a shielded electric arc using an inert gas to surround the electrode produces the best results. A helium or argon shielded arc gave excellent results, but this method is not part of my invention and such arcs are disclosed more fully and claimed in Patent No. 1,746,081 Hobart and Patent No. 1,746,191 Devers. This is made possible by the constricted section of metal formed by the relatively narrow tooth 5 which concentrates the heat during the welding operation in a relatively small section of metal which, therefore, is more readily heated and facilitates the welding together of the laminations by a relatively rapid process forming a relatively thin and shallow integral connection between adjacent laminations. The slots on each side of the tooth limit the conduction of the heat away from the weld by restricting the path to a small section at the base of the tooth and this minimizes distortion of the laminations in addition to effecting the more rapid heating of the welded edge of the tooth. The welding together of the laminations on the outer edge of the tooth opposite the shallow winding slots also reduces the tendency of the welding operation to change the magnetic properties of the material of which the laminations are made, and since the weld has a relatively small cross-sectional area, its resistance is relatively high and its short-circuiting effect on currents in the core is relatively small. Furthermore, since this weld is formed on the outer periphery of the small teeth 5 in this type stator punching, the welded section is lower than the average outer peripheral surface of the core, and this eliminates any machining operation which might be required in order to obtain a uniform outer periphery for the completed assembly. In order to provide a rigid construction, a plurality of these welded teeth of restricted section are arranged about the outer periphery of the core. In the illustrated construction, four of these teeth 5 are provided corresponding to the four relatively wide core sections opposite the four sets of relatively shallow winding slots 3. This permits the construction of an assembled laminated core in which all of the outer dimensions of the core are limited solely by the dimensions of the magnetic material required for the proper operation of the device in which the laminated core is to be used, as no external securing means are provided and no projections beyond the dimensions of the core are required for holding the assembly together. In some instances the shallow grooves 4 may be used as keyways for locating and securing the core in a stator shell or frame, thus providing a utility for this feature.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. An electrical device core member formed of laminations having a pair of closely spaced longitudinally extending slots in one edge thereof forming a relatively narrow tooth extending over a peripheral surface of said laminations, the base of said tooth being substantially recessed below the outer periphery of said laminations, and a weld of the outer edges of said laminations along said tooth for securing together said laminations in assembled relationship.

2. A dynamoelectric machine core member formed of laminations having winding slots in one edge thereof, a pair of longitudinally extending slots in the opposite edge thereof forming a relatively narrow tooth extending over a peripheral surface of said laminations, the base of said tooth being substantially recessed below the outer periphery of said laminations, and a weld of the outer edges of said laminations along said tooth for securing together said laminations in assembled relationship.

3. A dynamoelectric machine core member formed of laminations having winding slots in one edge thereof, a pair of closely spaced longitudinally extending slots in the opposite edge thereof forming a tooth extending over a peripheral surface of said laminations, the base of said tooth being substantially recessed below the outer periphery of said laminations, and a weld of the outer edges of said laminations along said tooth for securing together said laminations in assembled relationship.

4. A dynamoelectric machine core member of magnetic material formed of laminations having winding slots in one edge, a pair of closely spaced shallow longitudinally extending slots in the opposite edge thereof forming a relatively narrow tooth extending longitudinally over a peripheral surface of said laminations, the base of said tooth being substantially recessed below the outer periphery of said laminations, and a shallow weld of the outer edges of said laminations along said tooth for securing together said laminations in assembled relationship.

5. An electrical device core including an assembly of a plurality of laminations of magnetic material with a plurality of sets of relatively deep winding slots and a plurality of sets of relatively shallow winding slots intermediate adjacent sets of relatively deep slots formed in one edge of said core, a pair of closely spaced notches in each of said core laminations opposite said relatively shallow winding slots forming a relatively narrow tooth extending longitudinally of a peripheral surface of said assembly core laminations, the outer edge of said tooth being below the outer periphery of said core laminations, and a shallow weld of the outer edges of said laminations along the outer end of said tooth for securing together said laminations in assembled relationship.

6. An electrical device core including an assembly of a plurality of laminations of magnetic material with a plurality of sets of relatively deep winding slots and a plurality of sets of relatively shallow winding slots formed in the inner edge of said core, said shallow winding slots being arranged intermediate adjacent sets of said relatively deep slots and providing a relatively wider core section between the base of said shallow winding slots and the outer periphery of said core than said relatively deep slots, pairs of closely spaced shallow notches in the edge of each of said core laminations opposite said sets of relatively shallow winding slots forming relatively narrow short teeth extending longitudinally of the outer peripheral surface of said assembled core laminations, the outer edge of said tooth being below the outer periphery of said core laminations, and shallow welds of the outer edges of said laminations along the outer end of said teeth for securing together said laminations in assembled relationship.

7. An electrical device core member formed of laminations having a pair of closely spaced longitudinally extending slots in one edge thereof forming a relatively narrow tooth extending over a peripheral surface of said laminations, the outer edge of said tooth being below the outer periphery of said core laminations, and a weld of the outer edges of said laminations along said tooth for securing together said laminations in assembled relationship.

8. A dynamoelectric machine core member formed of laminations having winding slots in one edge thereof, a pair of longitudinally extending slots in the opposite edge thereof forming a relatively narrow tooth extending over a peripheral surface of said laminations, the outer edge of said tooth being below the outer periphery of said core laminations, and a weld of the outer edges of said laminations along said tooth for securing together said laminations in assembled relationship.

LOYD M. DOLAN.

REFERENCES CITED

The following references are of record in the file of this patent:

UNITED STATES PATENTS

| Number | Name | Date |
|---|---|---|
| 1,305,604 | Holey | June 3, 1919 |
| 1,771,475 | Wright | July 29, 1930 |
| 2,343,354 | Wolf | Mar. 7, 1944 |

FOREIGN PATENTS

| Number | Country | Date |
|---|---|---|
| 167,285 | Switzerland | May 1, 1934 |